United States Patent
Birgen (10) Patent No.: US 11,001,432 B1
(45) Date of Patent: May 11, 2021

(54) FOOD CONTAINER WITH FORCED MOISTURE REMOVAL

(71) Applicant: Kyllburg Technologies, LLC, Tempe, AZ (US)

(72) Inventor: William Birgen, Tempe, AZ (US)

(73) Assignee: SAVR Pak Inc., San Juan Capistrano, CA (US)

( * ) Notice: Subject to any disclaimer, the term of this patent is extended or adjusted under 35 U.S.C. 154(b) by 0 days.

(21) Appl. No.: 16/242,271

(22) Filed: Jan. 8, 2019

Related U.S. Application Data (63) Continuation-in-part of application No. 15/990,403, filed on May 25, 2018, which is a continuation-in-part of application No. 14/709,365, filed on May 11, 2015, now Pat. No. 10,035,632.

(60) Provisional application No. 61/993,949, filed on May 15, 2014.

(51) Int. Cl.
| | |
|---|---|
| *B65D 81/26* | (2006.01) |
| *B65D 25/00* | (2006.01) |
| *B65D 51/28* | (2006.01) |
| *B65D 51/16* | (2006.01) |
| *B65D 43/16* | (2006.01) |
| *B65B 25/00* | (2006.01) |
| *B32B 7/12* | (2006.01) |

(52) U.S. Cl.
CPC .......... *B65D 81/264* (2013.01); *B65B 25/001* (2013.01); *B65D 43/162* (2013.01); *B65D 51/1605* (2013.01); *B65D 51/28* (2013.01); *B32B 7/12* (2013.01); *Y10T 428/14* (2015.01)

(58) Field of Classification Search
CPC .... B65D 81/264; B65D 51/28; B65D 43/162; B65D 81/26; B65D 81/18; B65D 81/28; B65D 43/02; B65D 2251/0003; B65B 25/001
See application file for complete search history.

(56) References Cited

U.S. PATENT DOCUMENTS

| | | | | |
|---|---|---|---|---|
| 2,208,855 | A * | 7/1940 | Riley | A61F 7/10 |
| | | | | 62/1 |
| 2,210,946 | A * | 8/1940 | Moore | B65D 81/18 |
| | | | | 62/1 |
| 2,302,639 | A * | 11/1942 | Moore | A23L 3/364 |
| | | | | 62/60 |
| 3,929,131 | A * | 12/1975 | Hardwick | A61F 13/00063 |
| | | | | 604/291 |
| 4,498,586 | A | 2/1985 | Vitale | |
| 4,534,354 | A * | 8/1985 | Bonner, Jr. | A41D 13/0568 |
| | | | | 607/108 |

(Continued)

*Primary Examiner* — Patricia L. Nordmeyer
(74) *Attorney, Agent, or Firm* — Venjuris, P.C.

(57) ABSTRACT

A method, a food container, a lid, and pad for a food container that actively removes moisture in the food container without changing the food temperature inside the container in a meaningful way are disclosed herein. The removal of moisture is achieved by introducing a cold spot (below the dew point temperature) inside the food container that forces condensation of moisture near the cold spot. The condensed moisture is then captured by an absorbent element placed below, and preferably adjacent to/collocated with, the cold spot and between the cold spot and the stored food. The cold spot is preferably achieved by a properly chosen frozen substance such as an ice cube or a frozen gel packet or ice trapped inside an absorbent pad.

25 Claims, 8 Drawing Sheets

(56) References Cited

U.S. PATENT DOCUMENTS

| | | | |
|---|---|---|---|
| 6,270,873 B1* | 8/2001 | Darnett | B65D 81/264 |
| | | | 428/76 |
| 7,950,249 B1 | 5/2011 | White | |
| 10,499,667 B2* | 12/2019 | Milligan | D04H 1/488 |
| 2004/0267223 A1* | 12/2004 | Etchells | B65D 81/264 |
| | | | 604/385.01 |
| 2006/0016212 A1 | 1/2006 | Roth | |
| 2008/0087037 A1 | 4/2008 | Rapaz | |
| 2008/0302678 A1 | 12/2008 | Hunwisk | |
| 2010/0005973 A1 | 1/2010 | Doglioni Majer | |
| 2010/0320210 A1 | 12/2010 | Cimmerer et al. | |
| 2012/0053546 A1* | 3/2012 | Fogg | A61F 7/10 |
| | | | 604/367 |
| 2013/0008897 A1 | 1/2013 | Rusnak | |
| 2013/0056369 A1 | 3/2013 | Jorgensen | |

* cited by examiner

FOOD CONTAINER WITH FORCED MOISTURE REMOVAL

BACKGROUND

Crispy or crunchy food stored in a food container becomes soggy after a very short period of time. Because of this, delivered or take-out food rarely tastes as good as it is served in a restaurant, and lunches prepared at home in the morning are not as delicious as they should be.

This problem is caused by moisture trapped in the food container. Existing solutions, such as US Patent Publication No. 2010/00320210, passively vent the trapped moisture out of the container. These solutions are limited because relying on air circulation alone, the moisture is not removed fast enough, or at least in an amount of time that is meaningful to avoid condensation inside the container, and eventually the moisture comes back to the food. In addition, by introducing ambient air from outside the container (through an open vent), the temperature inside changes, making hot food colder or salads warmer. Furthermore, since the replacement air that enters the vented container contains moisture as well, adopting these solutions results in introducing more moisture into the food container and the food.

Other strategies, such as US Patent Publication No. 2013/0056369, use absorbent materials placed on the interior side of the lid with passive/natural convection to absorb moisture. Like the solutions previously stated, the absorbent materials do not work well when a relatively large amount of moisture comes up from sizzling food.

Because the problem affects not only people's enjoyment of their lunches but also customer satisfaction of businesses that serve take-out food, and food shelf life, food containers that quickly and effectively remove moisture in the containers are needed.

SUMMARY

The structure, overall operation and technical characteristics of the present invention will become apparent with the detailed description of preferred embodiments and the illustration of the related drawings as follows.

The invention is incorporated in a method, a food container, and a lid or a pad for a food container that actively removes moisture in the food container by introducing a localized cold spot (below the dew point temperature) inside the food container that forces condensation of the moisture at the cold spot. The condensed moisture is then captured by an absorbent element placed adjacent to, or collocated with, the cold spot and between the cold spot and the stored food so that condensed moisture extracted from the air inside the food container is trapped within the adsorbing substrate and the food does not become soggy before consumption.

An exemplary food container may or may not be sealable, such as a covered salad bowl, a pizza box, or a Styrofoam® box. The localized cold spot may comprise any cold substance, such as ice or a gel packet, and optionally a holder for the cold substance. The optional cold substance holder may at least include a bottom portion exposed to, preferably inside, the interior of the food container. The bottom portion may be made of materials with at least some heat transfer capability (i.e. low thermal resistance or high thermal conductivity). An example of the cold substance holder is a small receptacle, such as a plastic sauce cup or a ramekin, attached to the lid on the interior side, after a cold substance, such as ice, is contained inside.

For an embodiment of the food container that does not include a cold substance holder, the cold substance, such as a frozen gel packet, or ice, may be coupled to the lid and exposed to the interior of the food container. The cold substance is preferably frozen before use so that the intended condensation formation may be sufficiently fast and sustained. With a proper cold substance, the temperature of the cold spot is substantially at or below the dew point temperature. Therefore, the moisture inside the food container is exposed to the cold spot and condensation of vapor inside the container is forced to happen at a controlled localized feature.

Additionally, because the condensation of the moisture is forced, the absorbent element need not, but may, be substantially made of a desiccant element with hygroscopic qualities. Any absorbent materials including some inexpensive options such as paper towels, napkins, sponges, air-laid fibers, and tissues may be adopted as the absorbent element. The absorbent element is placed between the cold spot and the food, preferably adjacent to and below the cold spot. In addition, it is preferred that the lid further comprises a drip member, placed between the absorbent element and the food, and preferably coupled to the absorbent element, in order to prevent the absorbent element from releasing the captured condensate when reaching its saturation limit, which ideally would never happen. The drip member may be a tray or a film of materials that allows water vapor but not liquid water from moving in and out, such as a band aid.

Furthermore, in order to keep the temperature in the exemplary food container unaffected in a meaningful way, it is preferred that the cold spot comprises a frozen substance that is properly sized so that the heat released by the condensation phase change from vapor (to liquid) is offset by the heat absorbed by the phase change of the frozen substance to liquid. That is, the latent heat of vaporization must be balanced against the latent heat of fusion. As a general rule of thumb, for every 1 gram of ice as the frozen substance in a food container, ¼ gram of condensate can be formed without a temperature change within the food container. Alternatively, the heat released by the condensate formation may be absorbed by the frozen element without a phase change of the frozen substance to liquid. For example, ice made from an ordinary ice cube tray may be sufficient for condensing the vapor moisture inside a lunch box containing hot food, and when the ice cube melts, the food temperature is substantially unchanged.

Preferably, the amount of cold (preferably frozen) substance to be used would vary to coincide with the mass of the food inside the container and the moisture contained therein (by the food mass). Using well-known thermodynamic principles, those in the art can calculate custom versions of this invention for each meal, container, and specific application. In practice, it is preferred to create preset sizes (e.g., small, medium, large, etc,) depending on the approximate food mass and container size.

One embodiment of a condensation extracting insert for a food container with forced moisture removal comprises: a cold substance holder configured to contain a cold substance, such as ice or any non-toxic refrigerant gel/liquid, and a moisture absorbent element. The exemplary insert is configured, preferably with an adhesive attachment, to couple the insert to the interior wall of the food container's lid/cover, and its moisture absorbent element is located between the cold substance holder and food inside the food container. In addition, the exemplary insert may further comprise members stated above, such as a drip-proof member and an opening for accommodating the cold substance holder.

In another embodiment of the food container, the cold substance holder may be an independent inserted assembly that is self-supported and preferably removably coupled to the food container. The exemplary cold substance holder may comprise a receptacle for holding the cold substance, such as a small cup, a ramekin, or an adsorbing pad, and a stand for supporting the receptacle, such as a tripod. Alternatively, the cold substance holder may be merely a stand for supporting the cold substance, such as a pizza box tent for holding a frozen gel packet. See U.S. Pat. No. 4,498,586. Like the embodiments previously described, in this preferred embodiment, the absorbent element and the drip member are preferably placed near the cold spot, such as being attached to the bottom of the receptacle.

One embodiment of the method for actively removing moisture from a food container comprises the following steps:
providing the following items:
the food container having a lid, a base coupled to the lid, and an interior space formed between the lid and the base,
a cold substance holder having an interior bottom portion and an exterior bottom portion, and
a moisture absorbent element coupled to the exterior bottom portion of the cold substance holder;
placing a frozen element, such as an ice cube or a gel packet, onto the interior bottom portion of the cold substance holder;
placing the cold substance holder in the interior space of the food container and coupling the cold substance holder to the food container, either at the lid or the base, with the exterior bottom portion oriented toward the base of the food container;
placing food inside the food container; and
closing the food container.

Although the steps of the exemplary method are illustrated in a specific order, a person skilled in the art would know that the steps may be implemented in any alternate orders as long as forced condensation of moisture inside the food container is achieved and the condensed moisture is captured. In addition, the embodiment of the method may further comprise a step of providing a drip-proof member as illustrated above. Furthermore, the food container provided in this embodiment may have other members as stated above.

A third embodiment, which is presently preferred, employs adding a pre-determined amount of liquid to an absorbent pad, pre-freezing it, and then sticking it to the inside of a food box. In this embodiment, the moisture-removing pad to be coupled to a food container comprises a cold-substance-holding, moisture absorbent layer (the "absorbent layer") at the bottom side and an adhesive layer at its top side. The absorbent layer in this embodiment is configured to hold the cold substance either in its liquid or solid form. Once the cold substance is trapped inside the absorbent layer in its solid form, this embodiment may be placed inside a food container to force condensation as illustrated above and further absorb the condensate from the moisture inside the food container. As to the adhesive layer of this embodiment, it is configured to attach the embodiment to the upper interior wall of the food container, no matter what the ambient temperature is. In this embodiment, the adhesive layer may cover, entirely or partially, the top side of the embodiment as long as it provides sufficient adhesion.

Furthermore, the embodiment is preferably configured so that its absorbent layer is capable of absorbing, and not releasing, not only the condensate from the moisture but also the entire cold substance that turns into its liquid form after the heat exchange (i.e. melting). In an exemplary embodiment, the absorbent layer is made of air-laid fiber (or similar materials) with a 0.06" thickness and comprises a footprint surface area of 3.5"×3.5." The adhesive layer could any adhesive known in the art and suitable for these conditions.

Water is the usual liquid, but any food safe substance that can be absorbed by the absorbent layer as a liquid, then frozen (or chilled) will suffice (because it will force condensation inside a food container). In practice, it has been found that adding 1 teaspoon of water (measured in liquid form) to an absorbent layer and then freezing it is generally sufficient to maintain the temperature of a food container with up to four (4) ounces of food. In general, for containers with more food than four (4) ounces of food, it is preferred to include an additional one (1) teaspoon of water in the absorbent layer for every additional three (3) ounces of food prior to freezing the pad.

Indeed, applicant's test results of an exemplary pad with 3.5"×3.5"×0.06" air-laid absorbent fibers and 1 tablespoon of (20° F. frozen) water show a 35% reduction in relative humidity between treated and untreated food containers with no more than 12 ounces of 200° F. food.

However, when circumstances dictate, saltwater can be used in place of water as the liquid to be added to the absorbent layer. Saltwater can be advantageous because it has a lower freezing point than water. Introducing more latent heat exchange, more quickly (by the faster melting of the ice), will induce quicker condensation at the desired location. At present, saltwater having a salinity of 40-60 PPT (parts per thousand) is preferred, but other salinity level could work in a given situation.

The method of introducing the liquid (e.g. water) into the absorbent material is immaterial. Water can be added by spraying, misting, pouring, dipping, etc., provided the quantity introduced is appropriate for the given conditions. Following the introduction of the liquid, the entire pad is preferably frozen where it is stored waiting for use. When ready to use the frozen pad will be adhered to an inside surface of the food container, preferably the underside of the lid.

The presently preferred method for forcing moisture removal in a food container comprises the steps of:
introducing a predetermined amount of cold substance into an absorbent layer;
freezing the pad with the cold substance in the absorbent layer; and
adhering the pad to an upper interior wall of the food container by an adhesive layer at a top side of the pad.

To use this exemplary embodiment inside a pizza box, the user may:
spray, evenly pour, or drip 2 teaspoons of water on the absorbent layer; after the water is absorbed by the absorbent layer, put the embodiment in a freezer;
take the embodiment out of the freezer after the water inside the absorbent layer freezes (ideally at 20° F. or lower, depending on the operating limitations of the specific adhesive used in the adhesive layer); and
affix the embodiment inside the lid of the pizza box with the adhesive layer.

Now the pizza box is ready for a fresh pizza for delivery or to be enjoyed later. A person skilled in the art would know that a larger pizza may require two or more such embodiments. Indeed, Applicant's experiments show little or no discernible effect on the food quality by removing too much condensate using this method with more than enough such embodiments.

In addition, the embodiment may further comprise a backing layer configured to removably couple to the adhesive layer at the top side to prevent the adhesive layer from adhering to objects other than the intended lid of the food container before use. The embodiment may also have a moisture barrier layer between the adhesive layer and the absorbent layer so that the absorbed condensation or cold substance does not compromise the effectiveness of the adhesive layer. Moreover, the embodiment may further include another moisture barrier layer (i.e. a drip member as in other embodiments stated above) below the absorbent layer, configured to allow vapor, but not liquid, to pass through and thus prevent dripping. The moisture barrier layer between the adhesive layer and the absorbent layer and the moisture barrier layer below the absorbent layer in an embodiment may, or may not, be identical in materials or dimensions.

An alternate preferred embodiment with an absorbent layer, an adhesive layer, an upper moisture barrier layer between the absorbent layer and the adhesive layer, a lower moisture barrier layer at the bottom side of the absorbent layer, and a (removable) backing layer coupled to the adhesive layer may further include an opening at the top side through the backing layer, the adhesive layer, and the upper moisture barrier layer so that the cold substance may be introduced into the absorbent layer from the top side. The opening in this embodiment is preferably located in the middle of the pad and covering a 20-30% of the footprint surface area. This preferred embodiment is advantageous because the cold substance would be trapped at the back/upper side of the embodiment and dripping is further prevented when the cold substance turns into liquid after heat exchange with the moisture inside the food container.

Alternate embodiments of the pad may adopt different materials for the aforementioned elements and various shapes and dimensions based on the volume and dimension of the food container and amount of food. For instance, the absorbent layers in an embodiment may be made of any suitable materials, such as air-laid paper, cellulose sheets, trapped adsorbent powders, and so forth. The moisture barrier layer(s) in this embodiment may be any suitable commercially available moisture barriers, preferably with FDA approval and edible. Indeed, all the elements in any embodiment herein are preferably approved by FDA to be safely used inside a food container.

Additionally, the preferred shapes and dimensions of an exemplary absorbent layer depend on its absorbing capacity. For instance, a square embodiment to be used with an ordinary takeout box may have an absorbent layer that is made of standard air-laid fiber material with a standard density and preferably has a footprint surface area of at least 2" by 2" (i.e., 4 square inches) and a thickness of 0.06". Generally speaking, for every additional 4 ounces of food, the air-laid absorbent layer of a similar embodiment is preferably 0.01" thicker, but not to exceed 0.1" total thickness, measured dry. Indeed, empirically, thicker pads show diminishing performance improvement and gradually cease to scale.

Furthermore, the backing layer of an exemplary embodiment may comprise two pieces of release paper (e.g. wax paper) overlapping in the middle of the embodiment or alternatively includes an additional tab or a folded edge so that the backing layer can be easily removed and discarded from the adhesive layer. In another embodiment, the adhesive layer may cover only about 90% of the total surface area with a gap in the middle, and/or along the perimeter/edges, so the backing layer, with two separate sheets meeting in the middle when the gap is in the middle, can be easily removed. Additionally, the opening on the top side of an embodiment of the pad, for introducing water to be frozen, preferably takes 20-30% of the footprint surface area of the absorbent layer; and the opening may be of various shapes and have a surface area preferably equal to a circle with a diameter ranging from 1 inch to 5 inches.

Finally, the preferred cold substance for an embodiment of the pad is water, but any suitable cold substance that can be absorbed by the absorbent layer as a liquid, freeze, and force condensation inside a food container by phase change (melting) can be adopted. When water is used as the cold substance in an embodiment of the pad, 1 teaspoon of water, measured in liquid form, in the absorbent layer, when frozen, is generally sufficient to maintain the temperature of a food container with up to 4 ounces of food. For a food container with more food, it is preferred to include an additional teaspoon of water in the absorbent layer for every additional 3 ounces of food. Indeed, Applicants' test results of an exemplary pad with 3.5"×3.5"×0.08" air-laid absorbent fibers and 0.6 teaspoon of water show a 35% reduction in relative humidity between treated and untreated food containers with no more than 12 oz of 200° F. food.

Furthermore, an alternate embodiment of the moisture-removing pad to be coupled to a food container comprises a moisture absorbent layer at the bottom side and an adhesive layer at its top side. In this embodiment, the moisture absorbent layer itself comprises a cold substance. For such an embodiment, external cold substance may or may not be used for moisture removal. For instance, an embodiment may comprise an air-laid (or similar) moisture absorbent layer that already absorbs sufficient moisture from the ambient air, so that no more cold substance need be added.

One object of this invention is to provide an effective and affordable solution for removing moisture inside a food container by forced moisture removal.

Another object of this invention is to provide an effective and affordable solution for removing moisture without affecting the temperature inside a food container in a meaningful way.

BRIEF DESCRIPTION OF THE DRAWINGS

The objects, features and advantages of the present invention will be more readily appreciated upon reference to the following disclosure when considered in conjunction with the accompanying drawings, wherein reference numerals are used to identify the components in the various views.

DESCRIPTION OF THE EMBODIMENTS

Figure 1:
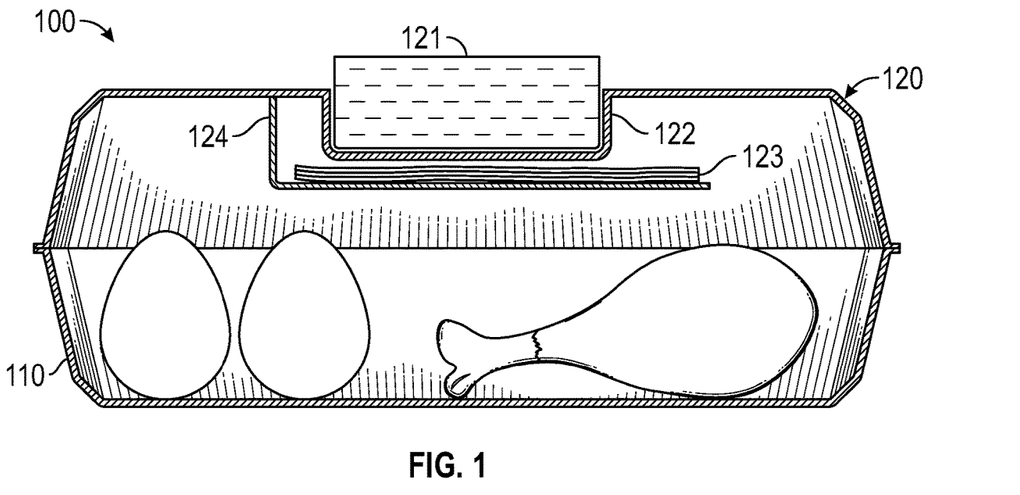
FIG. 1 shows a cross sectional view of an embodiment.

The preferred embodiments include a food container, a removable lid for a food container, and a method for removing moisture in the food container by forced condensation of the moisture and are illustrated in FIGS. 1-5. In FIG. 1, the embodiment is a food box 100 with a base 110 and a lid 120. The base 110 may contain food, hot or cold. The lid 120 may comprise a frozen element 121, a compartment 122 for containing the frozen element 121, an absorbent material 123 placed below the frozen element 121 and the compartment 122, and a drip tray 124. The lid 120 and base 110 are coupled together to close the food box 100. Preferably, the food box 110 may have a seal (not shown) between the lid 120 and the base 110 to achieve a better insulation and moisture control.

The frozen element 121 of the embodiment 100 in FIG. 1 may be any proper cold substance such as an ice cube (frozen water) or a frozen gel packet that may induce condensation of vapor moisture. A suitable compartment for containing the frozen element may comprise a depressed area 122 on the lid 120 as shown in FIG. 1, with or without its own cover for closing the compartment. Alternatively, the compartment may be located above the rest of the lid. Either way, the bottom portion of the compartment may have at least some heat transfer capability for facilitating heat exchange between the frozen element and the vapor inside the food container.

In addition, the embodiment 100 in FIG. 1 further comprises an absorbent material 123 placed inside the food container 100 and below, preferably very close to, the bottom portion of the compartment 122. The absorbent material 123 may be made of any suitable materials for capturing and isolating the condensed moisture, such as paper towel as adopted in this embodiment. The absorbent material 123 in FIG. 1 is supported by a drip tray 124, but it may alternatively be coupled to the interior side of the lid by any suitable means, such as adhesives and tapes, without contacting the tray. The drip tray 124 may be replaced by any drip member placed between the absorbent material and the stored food, such as a plastic film or a band-aid. An alternate embodiment may not have a drip tray or anything alike.

Figure 2:
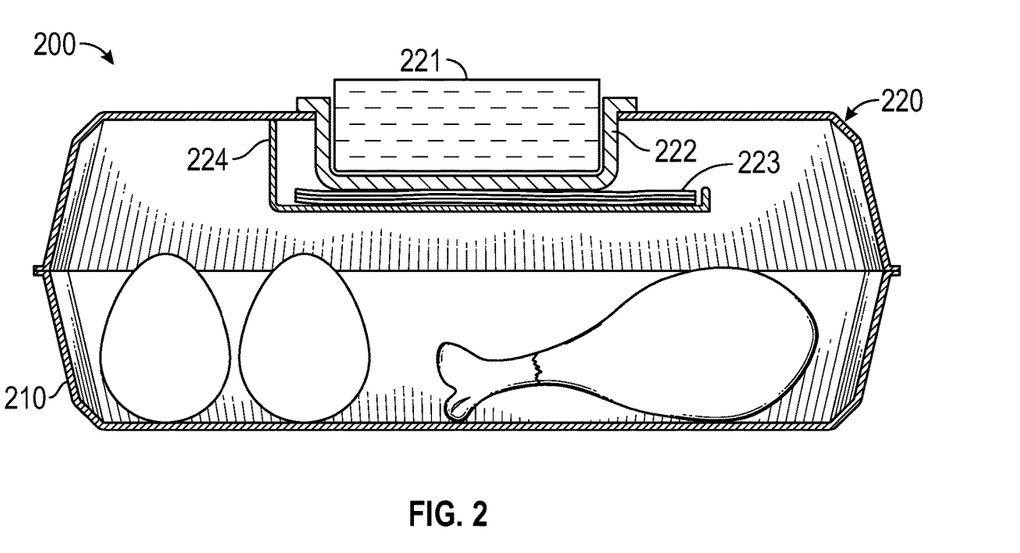
FIG. 2 shows a cross sectional view of an alternate embodiment.

An alternate embodiment 200 as shown in FIG. 2 is substantially similar to the previous embodiment 100. In this embodiment 200, the cold substance holder 222 is an insert of the lid 220 configured to hold a cold substance 221 and made of a thermal-conductive material. Since the cold substance holder 223 is separate from the cover 225, the cover 225 and the base 210 may be made of non-thermal-conductive materials so that the food inside is somewhat thermally insulated. In addition, the drip member 224, a drip tray, of this embodiment 200 has a raised edge configured to stop the moisture absorbent element 223 and released condensate, if any, from moving out of the tray.

Figure 3A:
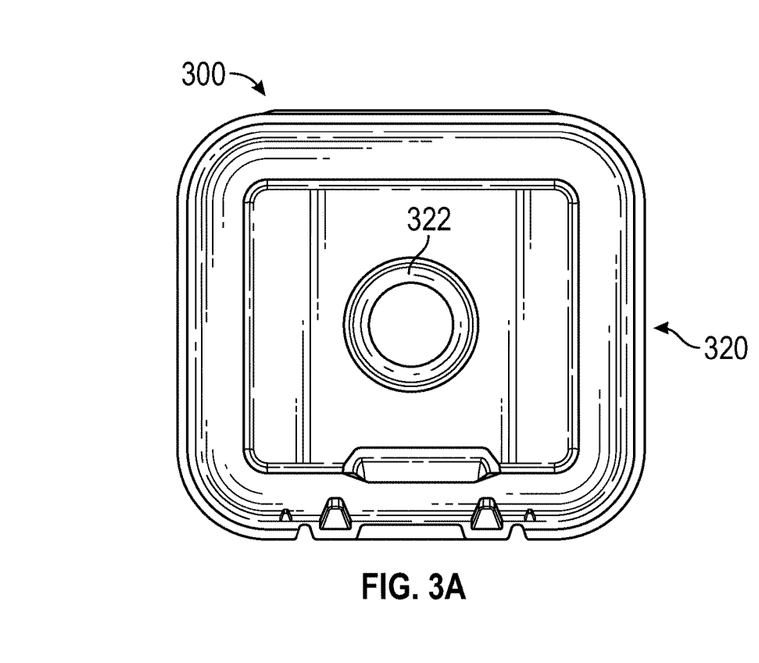
FIG. 3A shows a top view of another embodiment, with the lid closed.
Figure 3B:
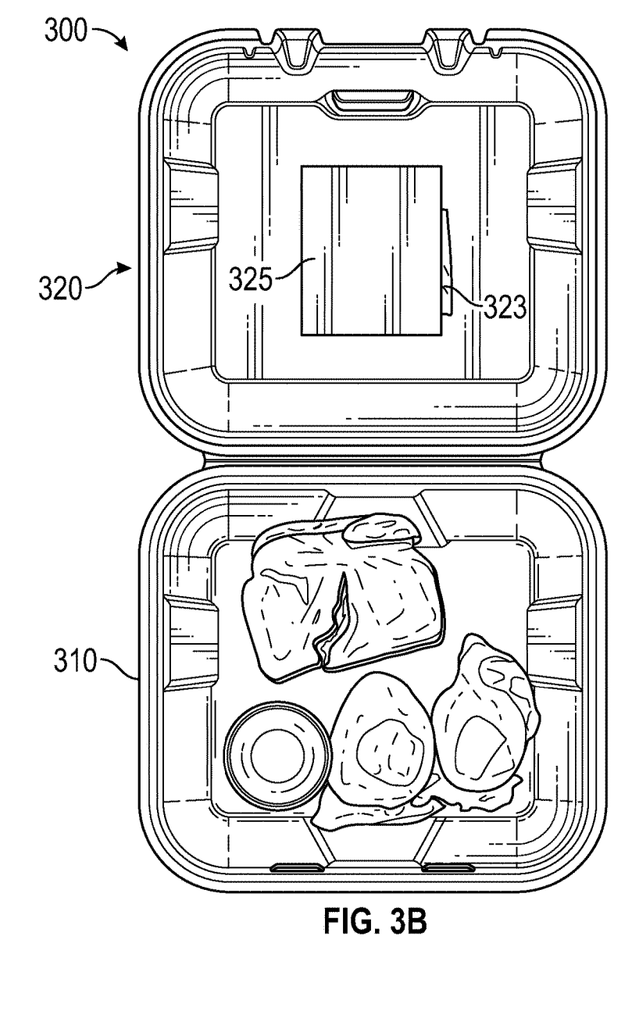
FIG. 3B shows a top view of the embodiment in FIG. 3A, with the lid open.
Figure 3C:
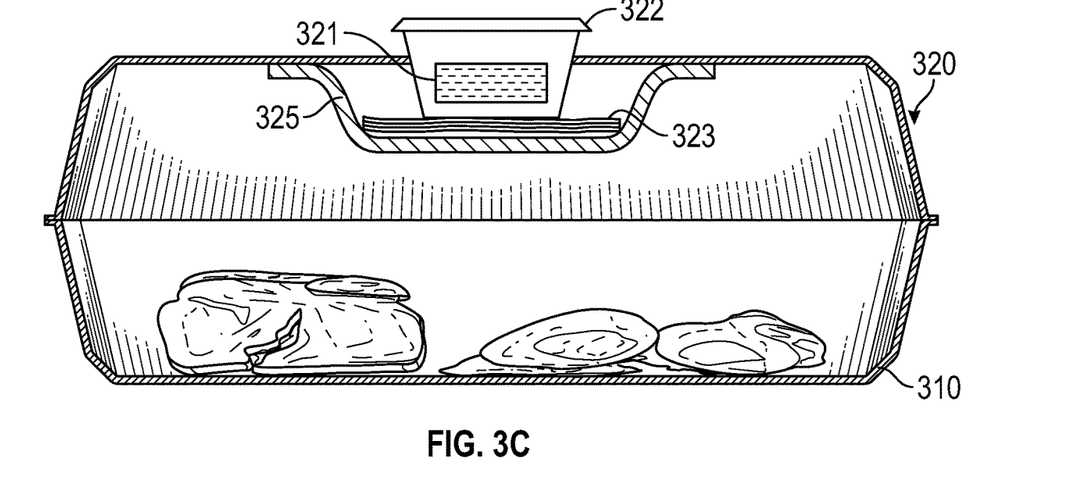
FIG. 3C shows a cross sectional view of the embodiment in FIG. 3A.

FIGS. 3A-3C show another embodiment 300. In this embodiment, the food container 300 is substantially made of Styrofoam®. A cold substance holder 322, a plastic sauce cup (e.g. ramekin) in this embodiment, is placed in a hole cut from the lid 320 and affixed to the lid 320. Right below the cold substance holder 322, a piece of paper towel 323, as an absorbent material, is coupled to a bottom of the cold substance holder 322 and the interior surface of the lid 320 by a band-aid-like, water resistant, and vapor permeable film 325, working as a drip member of the embodiment, and coupled to the moisture absorbent material 323. Like the embodiment 100, this food box 300 preferably has a seal 326 between the lid 320 and the base 310 (attached to the lid 320 in this embodiment 300) to achieve a better insulation and moisture control.

In an alternate embodiment, the food container is identical to the embodiment 300 except that the paper towel 323 is coupled to the lid 320 by adhesive tape or backing on four sides without any drip member. In an experiment with this alternate embodiment, hot food, including a crispy toast, 2 eggs, and a small container with boiling water, was placed inside the embodiment and an ordinary Styrofoam® box as a control food container, respectively. After that, the lids were closed and an ice cube 321 slightly larger than a standard ice cube was placed in the sauce cup of the embodiment, which works as the cold substance holder. A short period later, the toast in the control food container became soggy while the toast in the embodiment was still crispy and hot. Therefore, the embodiment shows that the invention works as planned.

Figure 4:
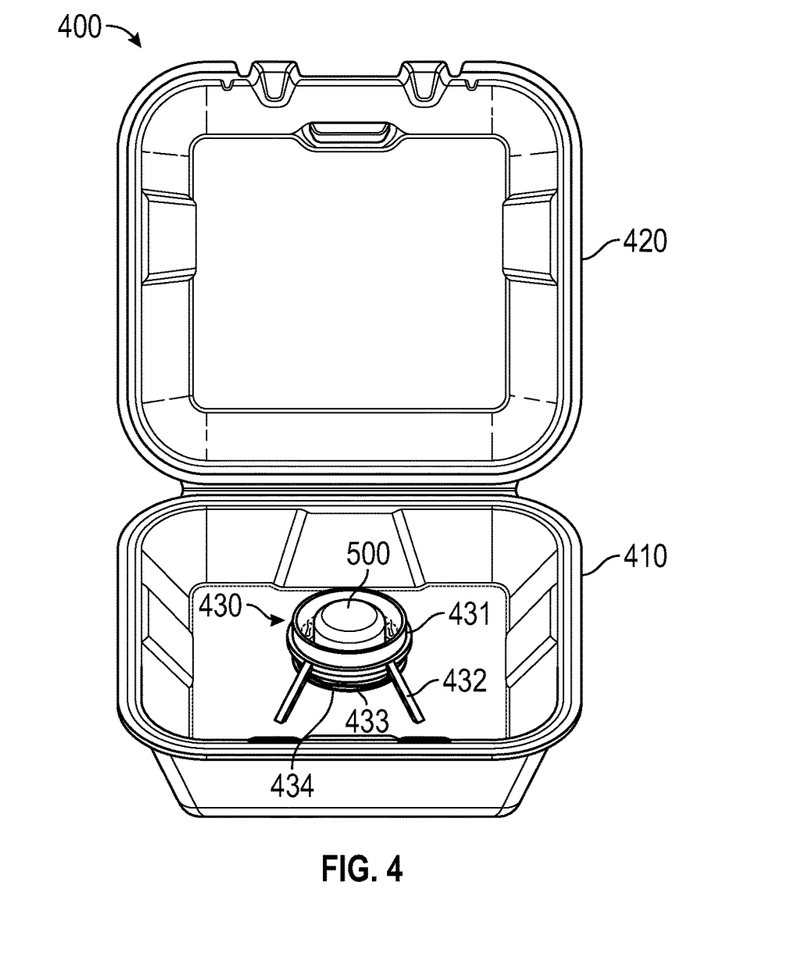
FIG. 4 shows a top view of another embodiment, with its lid open.

Another embodiment is shown in FIG. 4. In this embodiment 400, the food container 400 comprises a base 410, a lid 420 coupled to the base 410, and a cold-substance holding assembly 430 removably coupled to the base 410. The cold substance holding assembly 430 comprises a receptacle 431 configured to hold a cold substance 500, a stand 432 coupled to and configured to elevate the receptacle 431, a moisture absorbent element 433 coupled to a bottom of the receptacle 431, and a drip member 434 coupled to and placed beneath the moisture absorbent element 433. The receptacle 431 in this embodiment 400 may or may not have a cover. In another embodiment where the bottom of the receptacle has little heat transfer capability, the forced condensation may occur mostly above the receptacle, and therefore, the cold substance holding assembly may not include a moisture absorbent element or a drip member.

Figure 5A:
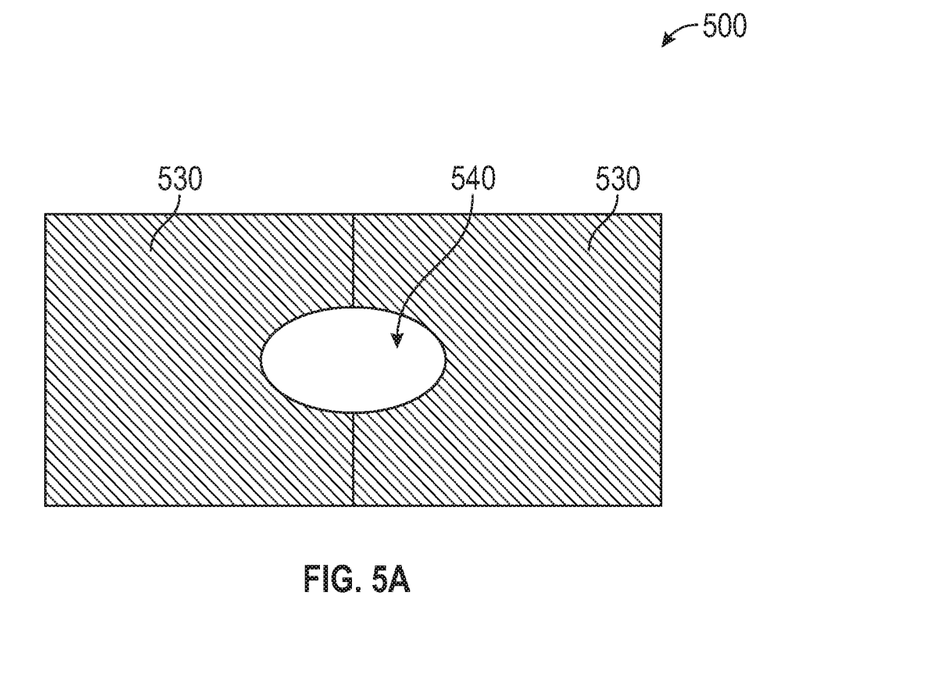
FIG. 5A shows a top view of an embodiment of the pad to be attached inside a food container.
Figure 5B:
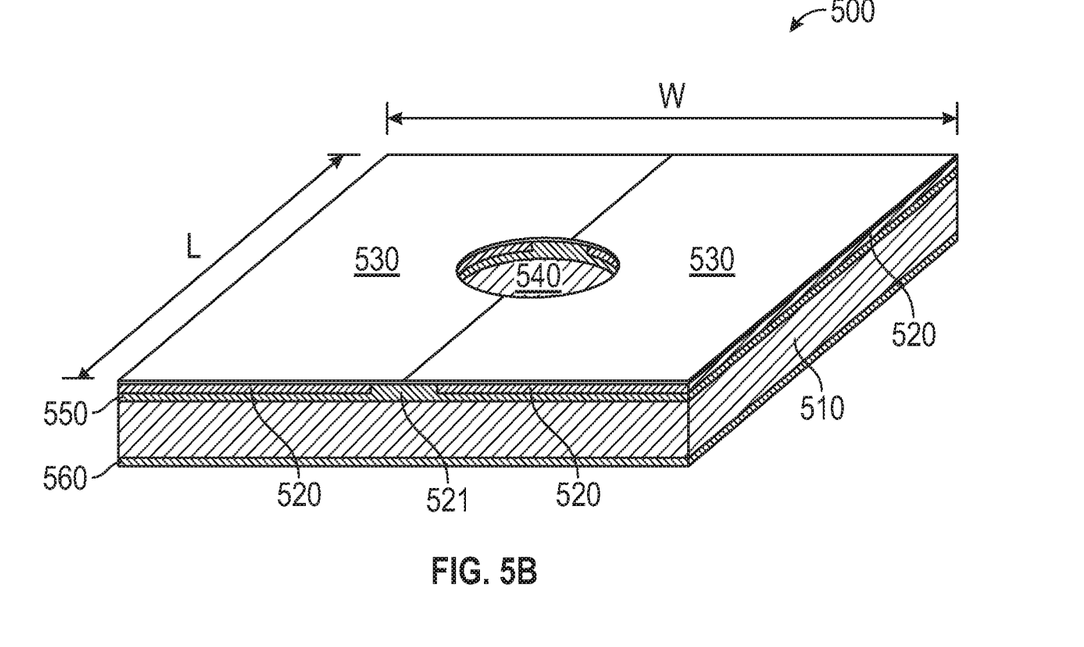
FIG. 5B shows a perspective view of the embodiment in FIG. 5A.

FIGS. 5A and 5B show a preferred embodiment, which features an exemplary pad 500 to be attached inside a food container. This pad 500 comprises an absorbent layer 510, an adhesive layer 520, a backing layer 530, an upper and lower moisture barrier layers 550 & 560, and an opening 540. The absorbent layer 510 in this pad 500 is sandwiched between two moisture barrier layers 550 & 560 that allow moisture in the air, but not liquid water (condensate), to go through. The adhesive layer 520 has a gap 521 in the middle so that the backing layer 530 with two halves can be easily removed. Additionally, the opening 540 cuts through the backing layer 530, the adhesive layer 520, and the upper moisture barrier layer 550 and is configured to allow cold substance (water) to be introduced to the absorbent layer 510 from the top.

The amount of cold substance to be used varies depending on how big the food container is and how much food is to be stored in the food container. For instance, if the food container is a common takeout box designed to store 10 oz of food, then 1 teaspoon of water should be sufficient, while 1 tablespoon of water is preferred. (As stated above, over-extraction of condensation does not appear to affect food quality.) Additionally, the cold substance (water) is preferably trapped in 20-30% of the footprint surface area (L×W) of the absorbent layer 510.

A preferred method to use this pad 500 includes the steps of:
1. Introducing a predetermined amount of a cold substance in liquid form (water) from the top into the opening 540;
2. allowing the absorbent layer 510 to absorb the water;
3. putting the pad 500 into a freezer and allowing the cold substance to turn into solid form (ice); and
4. retrieving the pad 500, removing the backing layer 530, and sticking the pad 500 to a food container by the adhesive layer 520.

An alternate embodiment may have no moisture barrier like 560 at the bottom or any opening like 540 on the top. For such an embodiment, the cold substance can be introduced at the bottom, and the absorbent layer is preferably thicker so that no dripping will occur. Those in the art know how to size the pad for each particular circumstance so that no dripping occurs.

Another alternate embodiment of the moisture-removing pad to be coupled to a food container comprises a moisture absorbent layer at the bottom side and an adhesive layer at its top side. In this embodiment, no moisture is added to the absorbent element before freezing. The moisture absorbent layer absorbs sufficient moisture from the ambient air so that no additional water is needed. Otherwise, the same procedure is followed. That is, the moisture-removing pad is first frozen and then adhered to the food box.

Another embodiment is shown in FIGS. 6A-6D. In this embodiment, the food container 600 comprises a base 610, a lid 620 coupled to the base 610, and a pad-holding assembly (or feature) 630 integrated within the lid 620. The pad-holding assembly 630 is configured to expose a surface of a pad 640 to the interior of the food container 600 when a pad 640 is placed in the pad-holding assembly 630. In this embodiment, no adhesive is needed to secure the pad 640 to the lid 620. Gravity alone can be used to keep the pad 640 in the pad-holding assembly 630 and exposed to the interior of the container 600. Alternatively, the size of the pad 640 can be configured to create a friction-fit with one or more surfaces of the pad-holding assembly 630, which can help keep the pad 640 in place.

Figure 6A:
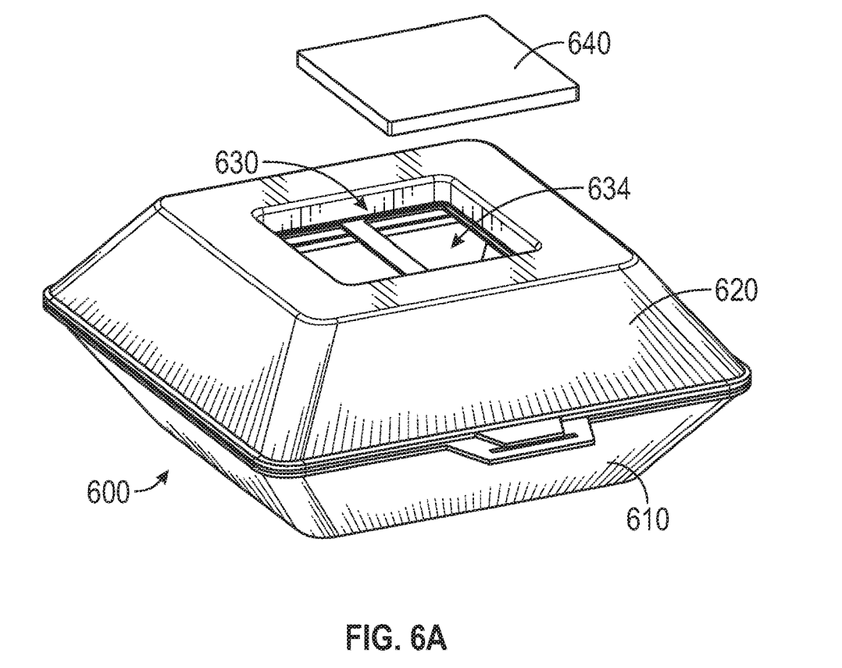
FIG. 6A shows a perspective view of an embodiment of the pad and a pad-holding assembly.
Figure 6B:
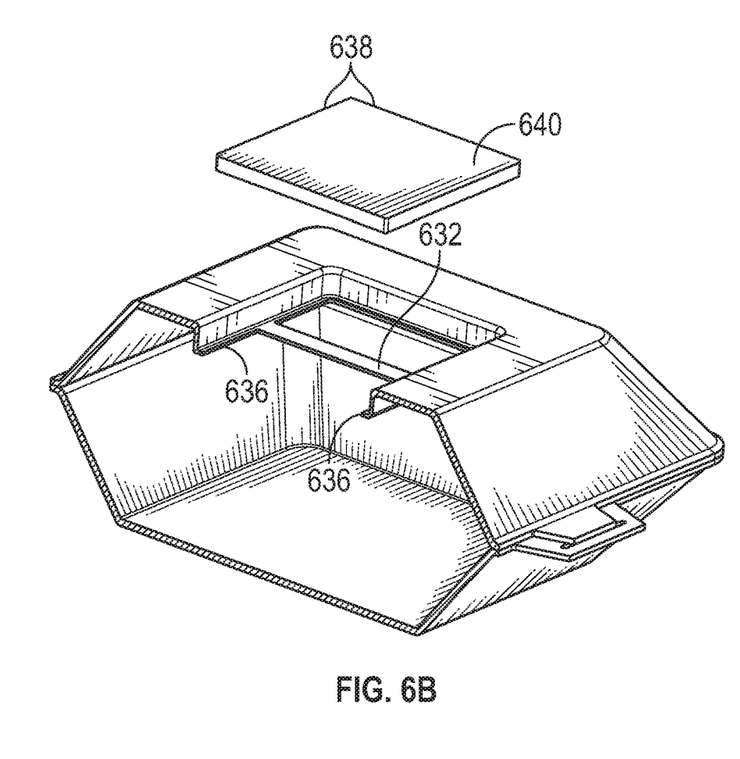
FIG. 6B shows a section view of the embodiment in FIG. 6A.
Figure 6C:
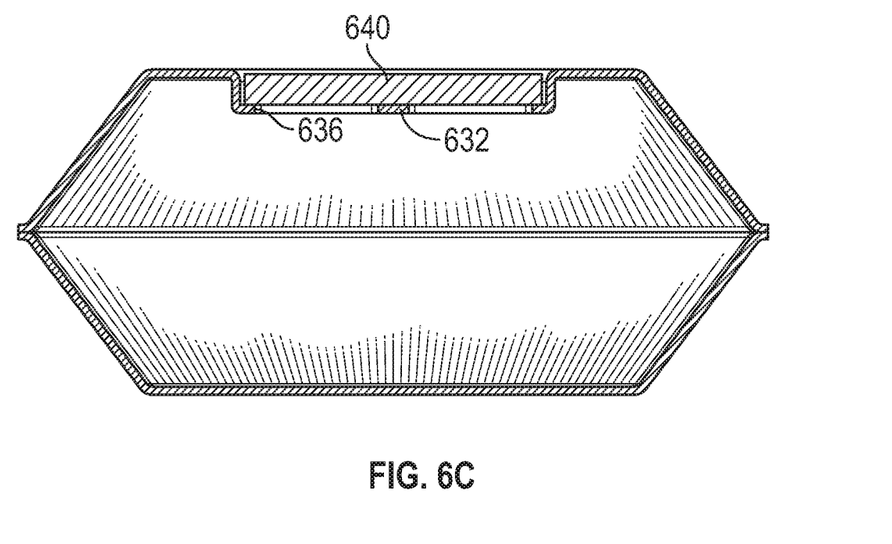
FIG. 6C shows a side view of the section view of FIG. 6B. top view of an embodiment of the pad.
Figure 6D:
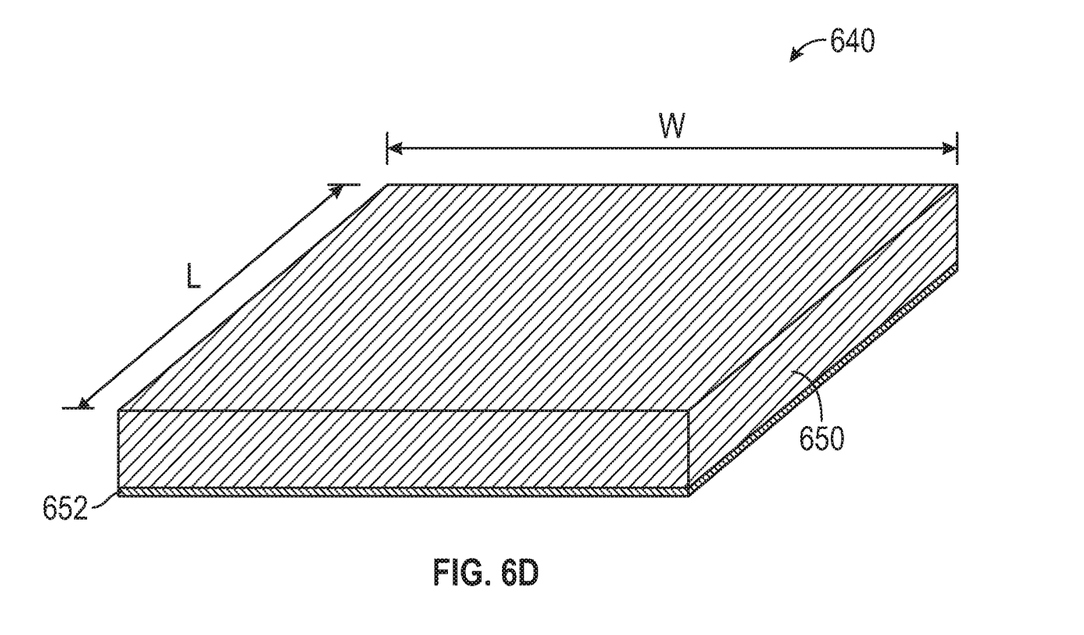
FIG. 6D shows an embodiment of the pad.

The pad-holding assembly 630 can be configured in a myriad of ways. One embodiment of the pad-holding assembly 630 is shown in FIG. 6B. One or more cross-members 632 can be used to span the opening 634. In addition, a lip 636 can be created (in part or in whole) around the perimeter of the opening 634. The lip 636 can be used to support the outside edge 638 of the pad 640.

In this embodiment, the pad 640 can be constructed in any of the ways previously described in this specification. It is preferred, however, that the pad 640 comprise an absorbent layer 650, which will hold some cold substance, and a moisture barrier layer 652. The absorbent layer 650 in this pad 640 is located above the moisture barrier layer 652 so that moisture in the air from inside the food container 600 can pass through the barrier layer 652, but liquid water (condensate) in the pad 640 will not drip into the food container 600. The moisture barrier layer 652 is optional if the absorbent layer is sized to avoid dripping condensation on the food as previously described.

As previously noted, the amount of cold substance to be used varies depending on how big the food container is and how much food is to be stored in the food container. For instance, if the food container is a common takeout box designed to store 10 oz of food, then 1 teaspoon of water should be sufficient, while 1 tablespoon of water is preferred. (As stated above, over-extraction of condensation does not appear to affect food quality.) Additionally, the cold substance (water) is preferably trapped in 20-30% of the footprint surface area (L×W) of the pad 640.

A preferred method to use this pad 640 includes the steps of:
1. Introducing a predetermined amount of a cold substance in liquid form (water) onto the pad 640;
2. allowing the absorbent layer 640 to absorb the water;
3. putting the pad 640 into a freezer and allowing the cold substance to turn into solid form (ice); and
4. retrieving the pad 640 and placing the pad 640 into the recessed holding assembly 630.

An alternate embodiment may have no moisture barrier like 652 at the bottom. For such an embodiment, the pad should be configured so that no dripping will occur. Those in the art know how to size the pad for each particular circumstance so that no dripping occurs.

Figure 7A:
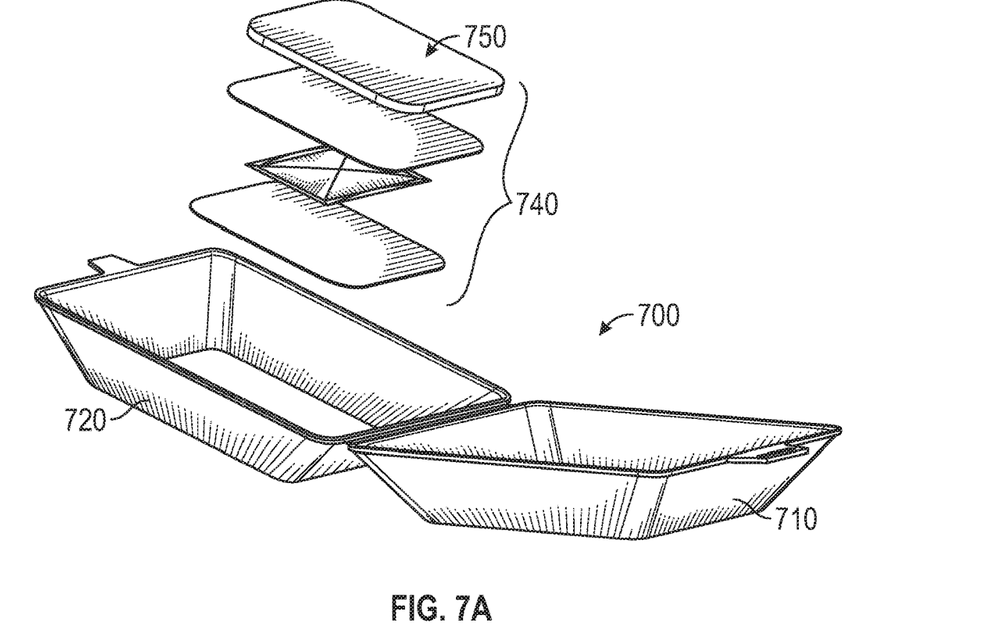
FIG. 7A shows a perspective exploded view of an embodiment of the pad/food container.
Figure 7B:
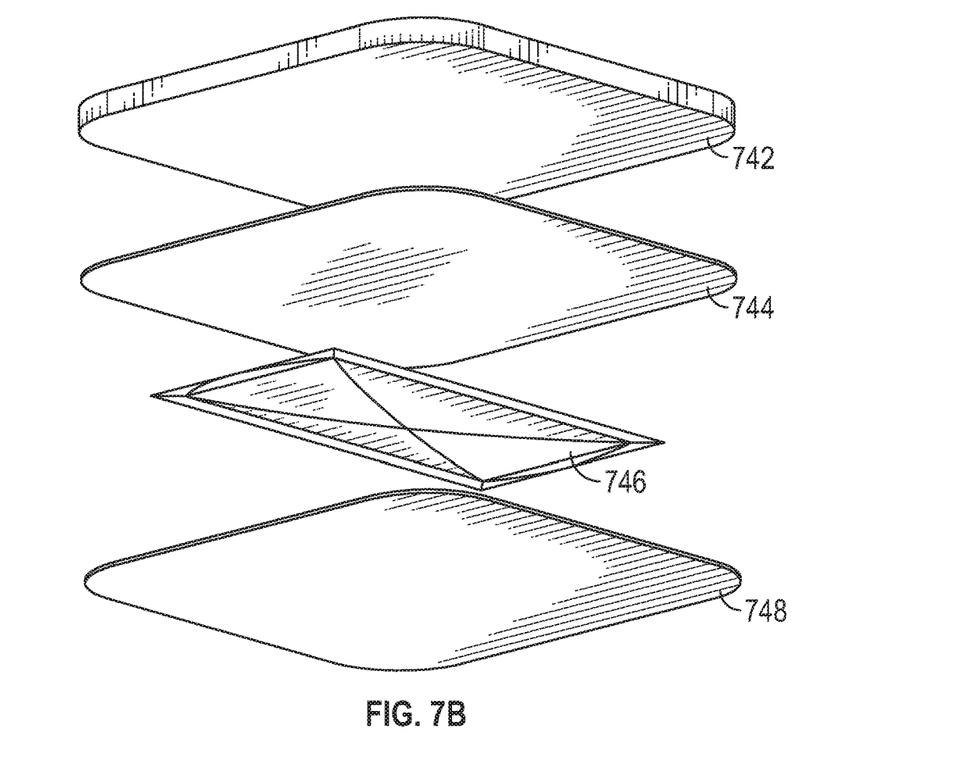
FIG. 7B shows an exploded view of the pad shown in FIG. 7A.
Figure 7C:
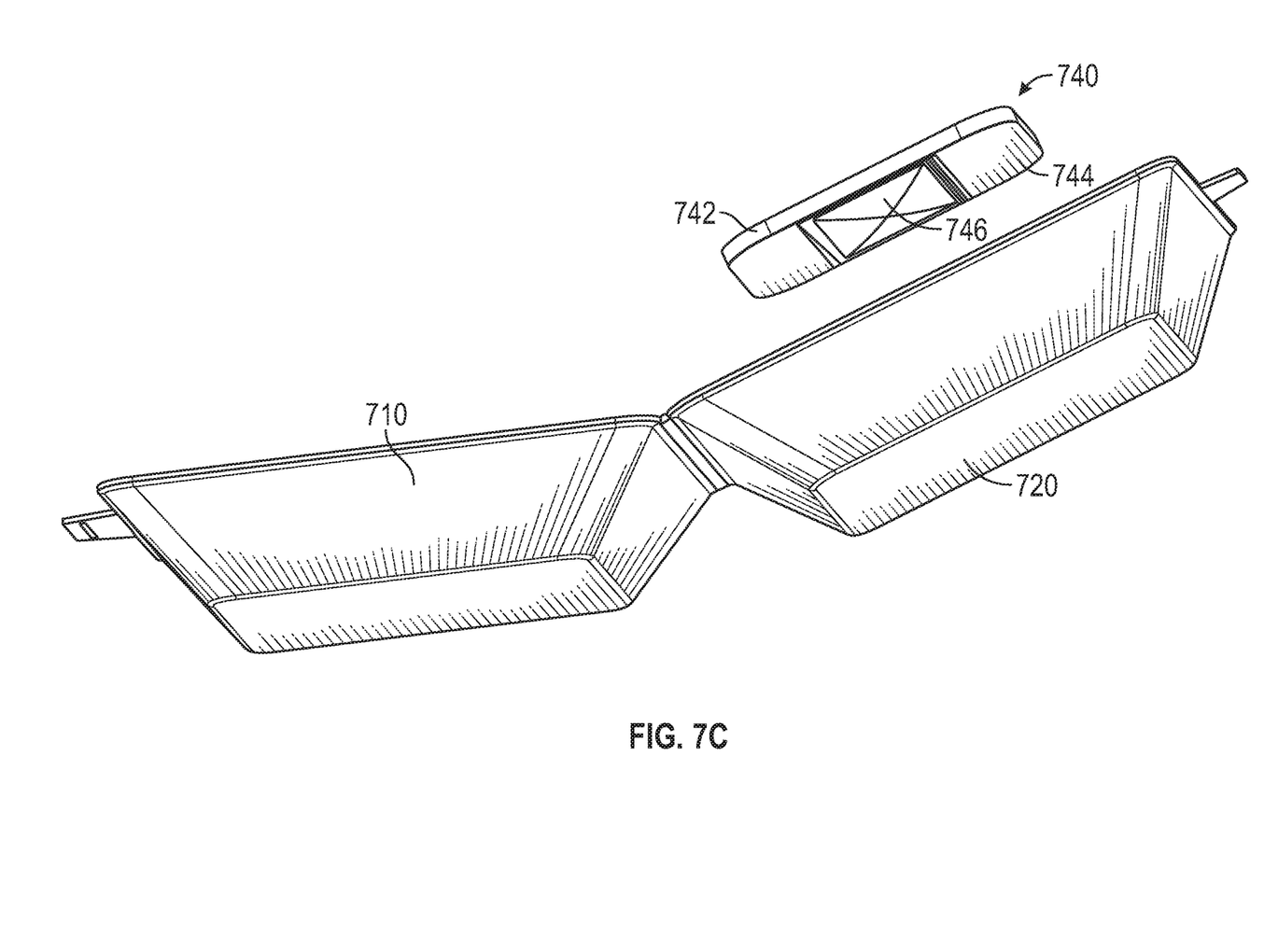
FIG. 7C shows a perspective exploded view of an embodiment of the pad/food container.

Another embodiment is shown in FIGS. 7A-7C. In this embodiment, the food container 700 comprises a base 710, a lid 720 coupled to the base 710, and a pad 740. The pad 740 is preferably comprises layers. FIG. 7B illustrates the preferred embodiment of a layered pad 740. Absorbent layer 742 is the layer previously discussed throughout this specification that absorbs liquid. The absorbent layer 742 preferably comprises an air-laid fabric or textile. When pad 740 is placed into the food container 700, absorbent layer 742 has a surface 750 that is exposed to the interior of food container 700.

Continuing now with FIG. 7B, adjacent to absorbent layer 742 is a double-sided adhesive layer 744. Adjacent to double-sided layer 744 is a freezable element 746. While it is preferred to freeze the entire pad 740, the freezable element 746 is preferably a sealed packet containing water or saltwater. Adjacent to the freezable element 746 is a removable backing 748 which protects the adhesive when it is being stored. As previously described, the removable backing 748 allows the pad 740 to be frozen first, and then adhered to the lid 720 after removing the backing 748 at the desired time.

The adhesive used on the double-sided adhesive layers 744 can be any adhesive known in the art. In the alternative, rather than have separate adhesive layers, adhesive material can be applied to a surface of the container or pad layers as needed to create they layered-effect shown in FIGS. 7A-7C. In operation, the pad 740, would be frozen first and then applied to the container prior to adding food.

While the invention has been described by means of specific embodiments, numerous modifications and variations could be made thereto by those ordinarily skilled in the art without departing from the score and spirit disclosed herein.

The invention claimed is:
1. A method for keeping food inside a container from getting soggy, the method comprising the steps of:
    adding a substance to an absorbent layer,
    cooling the absorbent layer, adding an amount of food to a container, the container comprising ambient moisture, creating a localized cold spot inside the container by inserting the absorbent layer into the container, wherein the absorbent layer forces condensation of the ambient moisture onto the absorbent layer.

2. The method of claim 1, further comprising the step of freezing the absorbent layer and absorbed substance prior to inserting into the container.

3. The method of claim 2, wherein the amount of absorbed substance is sized so that the heat released by the condensation of the ambient moisture is offset by the heat absorbed by the phase change of the frozen absorbed substance to liquid.

4. The method of claim 1, wherein the amount of absorbed substance varies with a mass of food to be contained.

5. The method of claim 1, wherein the amount of absorbed substance varies with a moisture of the food to be contained.

6. The method of claim 1, wherein the absorbed substance comprises water.

7. The method of claim 6, wherein the absorbed substance further comprising salt.

8. The method of claim 1, wherein the amount of absorbed substance is three teaspoons or less per 10 ounces of food.

9. A method for forcing moisture removal in a food container containing ambient moisture comprising the steps of:
   determining an amount of food to be added to the food container,
   sizing an amount of frozen substance to condense at least some ambient moisture without substantially cooling the food,
   adding an amount of liquid substance into the absorbent layer of the pad, the amount of liquid substance equivalent to the sized amount of frozen substance
   freezing the pad with the liquid substance in the absorbent layer;
   adhering the pad to an upper interior wall of the food container by an adhesive layer at a top side of the pad.

10. The method in claim 9 further comprising the step of removing a backing layer at the top side of the pad from the adhesive layer.

11. The method in claim 9, wherein the pad further comprises a moisture barrier layer located between the absorbent layer and the adhesive layer.

12. The method in claim 9, wherein the pad further comprises a moisture barrier layer coupled to the absorbent layer at the bottom side.

13. The method in claim 9, wherein the pad further comprises an opening on the top side, through the adhesive layer until the absorbent layer, configured to allow introduction of the cold substance into the absorbent layer.

14. The method in claim 13, wherein the opening has a surface area ranging from 20% to 30% of a surface area of the absorbent layer at the top side.

15. The method in claim 9, wherein the absorbent layer has a surface area at the bottom side of no less than 4 square inches.

16. The method in claim 9, wherein the absorbent layer has a thickness of no more than 0.1 inch.

17. The method in claim 9, wherein the adhesive layer is temperature resistant.

18. A method for keeping food inside a container from getting soggy, the method comprising the steps of:
   cooling an absorbent layer comprising an absorbed substance, wherein the amount of absorbed substance is less than three tablespoons per every 10 ounces of food to be contained
   adding an amount of food to a container, the container comprising an ambient moisture,
   inserting the cooled absorbent layer into the container, the absorbent layer forcing condensation of the ambient moisture onto the absorbent layer.

19. The method of claim 18, further comprising the step of freezing the absorbent layer and absorbed substance prior to inserting into the container.

20. The method of claim 19, wherein the amount of absorbed substance is sized so that the heat released by the condensation of the ambient moisture is offset by the heat absorbed by the phase change of the frozen absorbed substance to liquid.

21. The method of claim 18, wherein the amount of absorbed substance varies with a mass of food to be contained.

22. The method of claim 18, wherein the amount of absorbed substance varies with a moisture of the food to be contained.

23. The method of claim 18, wherein the absorbed substance comprises water.

24. The method of claim 23, wherein the absorbed substance further comprising salt.

25. The method of claim 18, wherein the amount of absorbed substance is three teaspoons or less per 10 ounces of food.

* * * * *